United States Patent [19]

Naito

[11] Patent Number: 5,025,393

[45] Date of Patent: Jun. 18, 1991

[54] TEACHING APPARATUS
[75] Inventor: Tatsuo Naito, Atsugi, Japan
[73] Assignee: Nissan Motor Co., Ltd., Yokohama, Japan
[21] Appl. No.: 366,926
[22] Filed: Jun. 16, 1989
[30] Foreign Application Priority Data Jun. 20, 1988 [JP]  Japan .................................. 63-150061

[51] Int. Cl.⁵ ............................................. G06F 15/00
[52] U.S. Cl. ......................................... 364/513; 901/3
[58] Field of Search .................... 364/513; 318/568.13, 318/568.14; 901/3-5

[56] References Cited

U.S. PATENT DOCUMENTS 3,744,032  7/1973  Engelberger et al. ............ 340/172.5

FOREIGN PATENT DOCUMENTS 1246280  9/1971  United Kingdom .

Primary Examiner—Allen R. Macdonald
Attorney, Agent, or Firm—Foley & Lardner

[57] ABSTRACT

A teaching apparatus is used with at least one manipulator arm capable of carrying out a plurality of distinct motions for carrying and positioning a work tool for performing a work function. The apparatus comprises a power unit including actuators for powering the respective motions of the manipulator arm, a control unit coupled through a first data line to the actuators for controlling the mechanical actuators, and a teach pendant connected through a second data line to the control unit and through a third data line to the mechanical actuators. The teach pendant is used to produce a motion command on the second and third data lines, the motion command having digit information specifying a selected one of the distinct motions of the manipulator arm and a teach command on the second data line. The power unit responds to the motion command fed thereto through the third data line from the teach pendant by selecting one of the actuators to power the selected motion of the manipulator arm. A value of displacement of the selected actuator is measured. The control unit stores the measured displacement value in response to the teach command fed thereto from the teach pendant.

1 Claim, 5 Drawing Sheets

TEACHING APPARATUS

BACKGROUND OF THE INVENTION

This invention relates to a teaching apparatus for use with at least one manipulator arm capable of carrying out a plurality of distinct motions for carrying and positioning a work tool for performing a work function.

Mechanical robot systems have been developed and utilized, for example, in an automobile assembling line having a series of work stations through which automobiles are assembled. Typically, such mechanical systems include an industrial robot in the form of a manipulator arm which carrys and positions a work tool for performing a work function, a power unit for powering the motions of the industrial robot, and a control unit having a program stored therein to control the motions of the industrial robot. Examples of such work functions are article clamping, article handling, such as loading and unloading a machine or transferring an article from one work station to another, spray painting, welding, brazing and the like. Normally, the control unit is programmed during a teach mode where motion commands are manually produced to generate a stored program. It has been found, however, that conventional industrial robots have not been entirely satisfactory because of slow response to start and stop commands produced manually during a teach mode.

SUMMARY OF THE INVENTION

Therefore, it is a main object of the invention to provide an improved teaching apparatus which can power a selected one of motions of a manipulator arm at a rapid response rate with respect to start and stop commands manually produce during a teach mode.

There is provided, in accordance with the invention, a teaching apparatus for use with at least one manipulator arm for carrying out a plurality of distinct motions to carry and position a work tool for performing a work function. The apparatus comprises a power unit including actuators for powering the respective motions of the manipulator arm, a control unit coupled through a first data line to the actuators for controlling the mechanical actuators, and a teach pendant connected through a second data line to the control unit and through a third data line to the mechanical actuators. The teach pendant includes means for producing a motion command on the second and third data lines, the motion command having digit information specifying a selected one of the distinct motions of the manipulator arm. The teach pendant also includes means for producing a teach command on the second data line. The power unit includes means responsive to the motion command fed thereto through the third data line from the teach pendant for selecting one of the actuators to power the selected motion of the manipulator arm. The power unit also includes means for measuring a value of displacement of the selected actuator. The control unit includes means responsive to the teach command fed thereto from the teach pendant for storing the measured displacement value.

BRIEF DESCRIPTION OF THE DRAWINGS

This invention will be described in greater detail by reference to the following description taken in connection with the accompanying drawings, in which.

DETAILED DESCRIPTION OF THE INVENTION

Prior to the description of the preferred embodiment of the present invention, a teaching apparatus from which this invention is improved will be described in order to specifically point out the difficulties attendant thereon.

Figure 1:
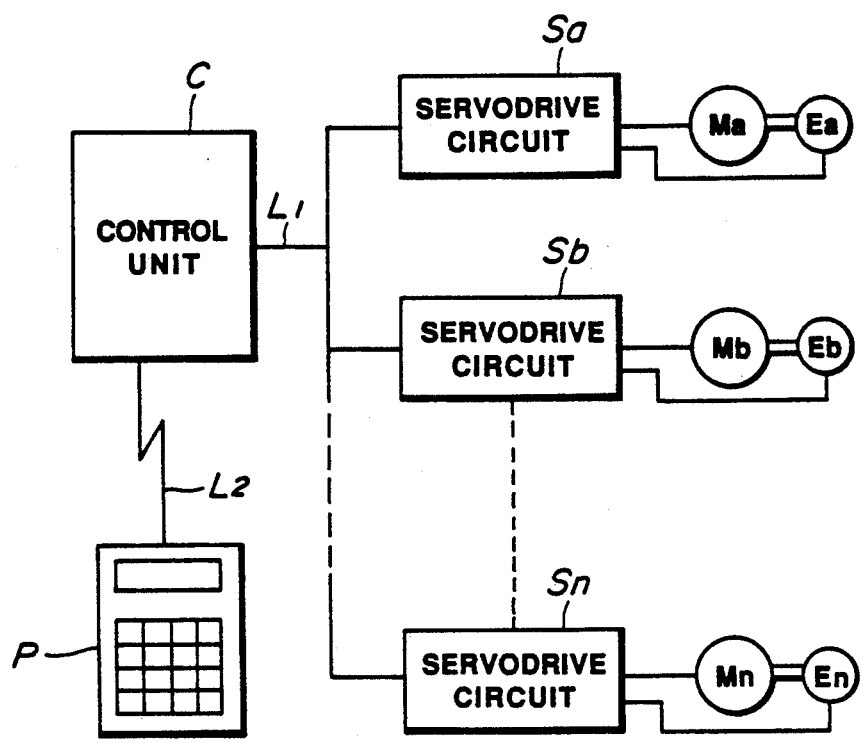
FIG. 1 is a schematic block diagram showing a teaching apparatus from which the invention is improved.

Referring to FIG. 1, the teaching apparatus is applied to a manipulator arm having n distinct degrees of freedom for its n distinct motions to carry and position a working tool for performing a work function. The motions of the manipulator arm are powered by mechanical actuators Ma, Mb, ... and Mn in the form of motors utilized in numbers equal to the number of controlled axes of the manipulator arm. Servodrive circuits Sa, Sb, ... and Sn are provided for controlling the respective machine actuators Ma, Mb, ... and Mn. Each of the servodrive circuits Sa, Sb, ... and Sn receives an input from corresponding one of encoders Ea, Eb, ... and En which sense the displacements of the respective mechanical actuators Ma, Mb, ... and Mn. The servodrive circuits Sa, Sb, ... and Sn are connected through a common data line L1 to a control unit C. The control unit C processes a stored program directing the motions of the manipulator arm through the servodrive circuits.

A teach pendant P is connected through a data line L2 to the control unit C for manually producing motion commands to generate a stored program. The teach pendant P has a push button pad having a number of buttons for entering information through the data line L2 to the control unit C. The push buttons include a teach mode command button and motion command buttons. When the teach mode command button is depressed, the teach pendant P produces a command causing the control unit C to operate in a teach mode. The motion command buttons have distinct numerical digits specifying the respective manipulator arm axes numbered in a predetermined sequence. A motion command button that is depressed produces a motion command with digit information specifying the manipulator arm axis to be moved. As long as the motion command button is depressed, the control unit C continues to move the specified manipulator arm axis. When the motion command button is released, the control unit C stops the motion of the specified manipulator arm axis. The control unit C includes a data processor, a memory, a serial-to-parallel (S/P) converter, and a parallel-to-serial (P/S) converter. The S/P converter converts the serial signal fed thereto from the teach pendant P into parallel form for application to the data processor. The P/S converter converts the data transferred thereto from the data processor into serial form for application to the servodrive circuits.

The operation is as follows: The control unit C awaits receipt of a motion command from the teach pendant P.

When a motion command button is depressed, the teach pendant P produces a motion command in the form of a serial signal including digit information specifying a selected servodrive circuit to be controlled for powering the corresponding mechanical actuator. This motion command is fed from the teach pendant P through the data line L2 to the control unit C. After the receipt of the motion command, the S/P converter converts it into parallel form for application to the data processor. The processed data are transferred from the data processor to the P/S converter which converts the processed data into a corresponding serial motion control signal including digit information specifying the selected servodrive circuit. This motion control signal is applied from the control unit C through the data line L1 to the servodrive circuits 2a, 2b, . . . and 2n.

The selected servodrive circuit responds to the motion control signal generated from the control unit C by powering the corresponding mechanical actuator to effect motion of the corresponding manipulator arm axis. The servodrive circuits other than the selected servodrive circuit effect no function. As long as the motion command button remains depressed, the selected servodrive circuit continues to power the corresponding mechanical actuator. If the motion command button is released, the teach pendant P will terminate the production of the motion command. This condition is processed in the control unit C which thereby produces a stop signal through the data line L1 to the servodrive circuits. The selected servodrive circuit responds to the stop signal by stopping the corresponding mechanical actuator to stop the corresponding manipulator arm axis. The corresponding encoder senses the displacement of the corresponding mechanical actuator during the time interval between the time at which the mechanical actuator starts and the time at which the mechanical actuator stops and produces a signal indicative of the sensed value of the mechanical actuator displacement. This signal is fed from the encoder to the corresponding servodrive circuit which stores the sensed mechanical actuator displacement value.

The control unit C awaits receipt of a teach mode command signal from the teach pendant P. When the teach mode command button is depressed, the teach pendant P produces a teach mode command in the form of a serial signal. This teach mode command is fed from the teach pendant P through the data line L2 to the control unit C. After the receipt of the teach mode command, the S/P converter converts it into parallel form for application to the data processor. The processed data is transferred to the P/S converter which converts it into a corresponding serial teach mode control signal. This teach mode control signal is applied from the control unit C to the servodrive circuits. The selected servodrive circuit responds to the teach mode control signal by transferring the stored mechanical actuator displacement value through the data line L1 to the control unit C where the data processor reads the mechanical actuator displacement value into the computer memory. This sequence is repeated for the servodrive circuits to generate a stored program and record in the computer memory. The stored record is played back by the control unit C to control the path of motion of the working tool carried by the manipulator arm.

One problem with such a teaching apparatus is that the control unit C produces a motion control signal delayed in time relative to the initiation of a motion command produced from the teach pendant P and a stop signal delayed in time relative to the termination of the motion command. This is stemmed mainly from the fact that the control unit C converts the motion command into parallel form for application to the data processor and converts the processed data into serial form for application to the servodrive circuits. Therefore, it is very difficult, if not impossible, to control the manipulator arm in a manner accomodated to the operator's demands during a teach mode.

Figure 2:
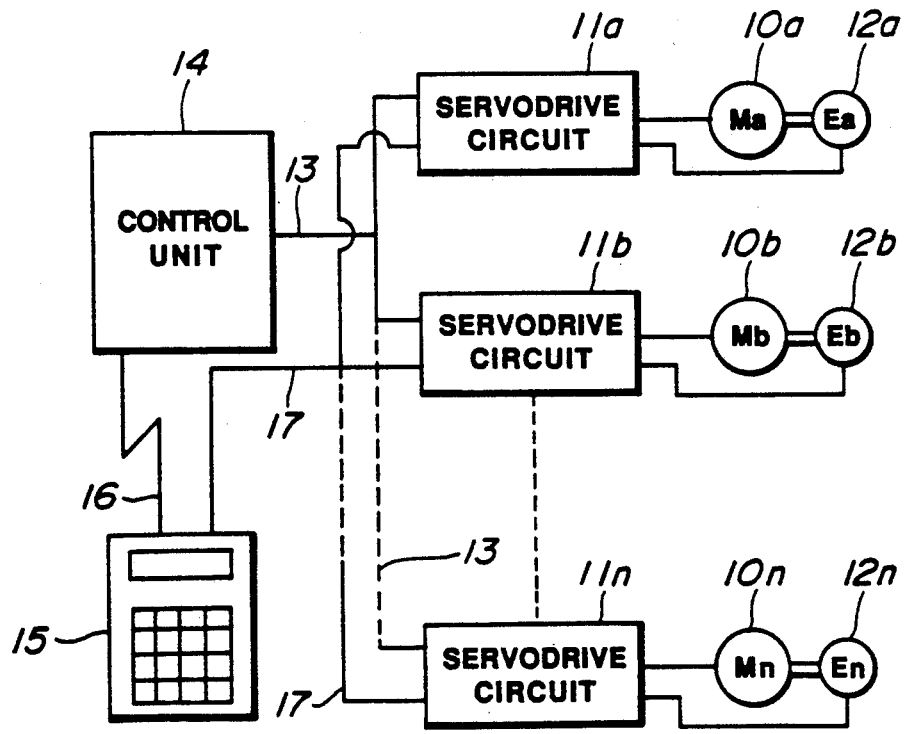
FIG. 2 is a schematic block diagram showing one embodiment of a teaching apparatus made in accordance with the invention.
Figure 3:
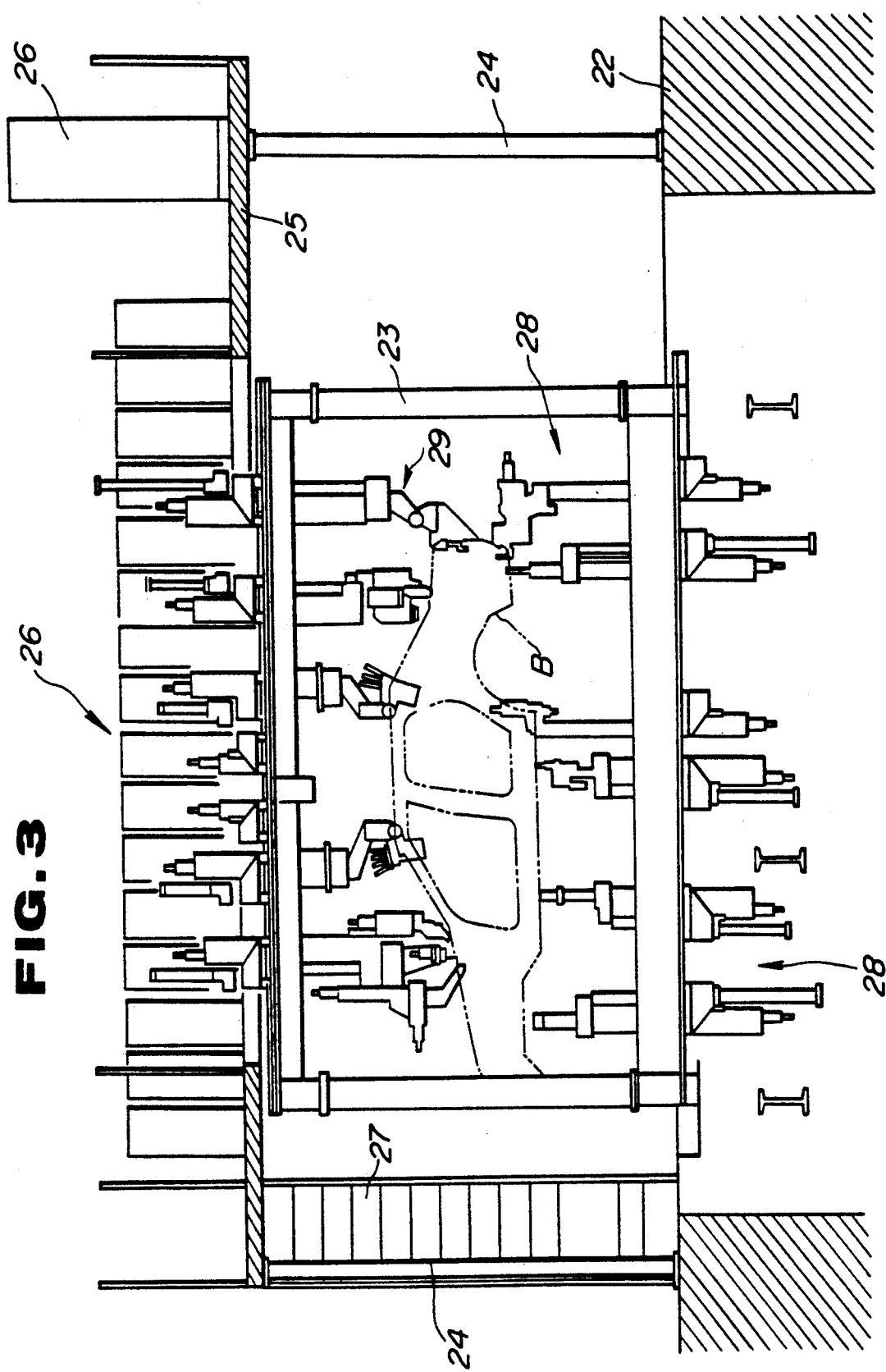
FIG. 3 is a side view partly in section of a tack welding station with which the invention may be employed.
Figure 4:
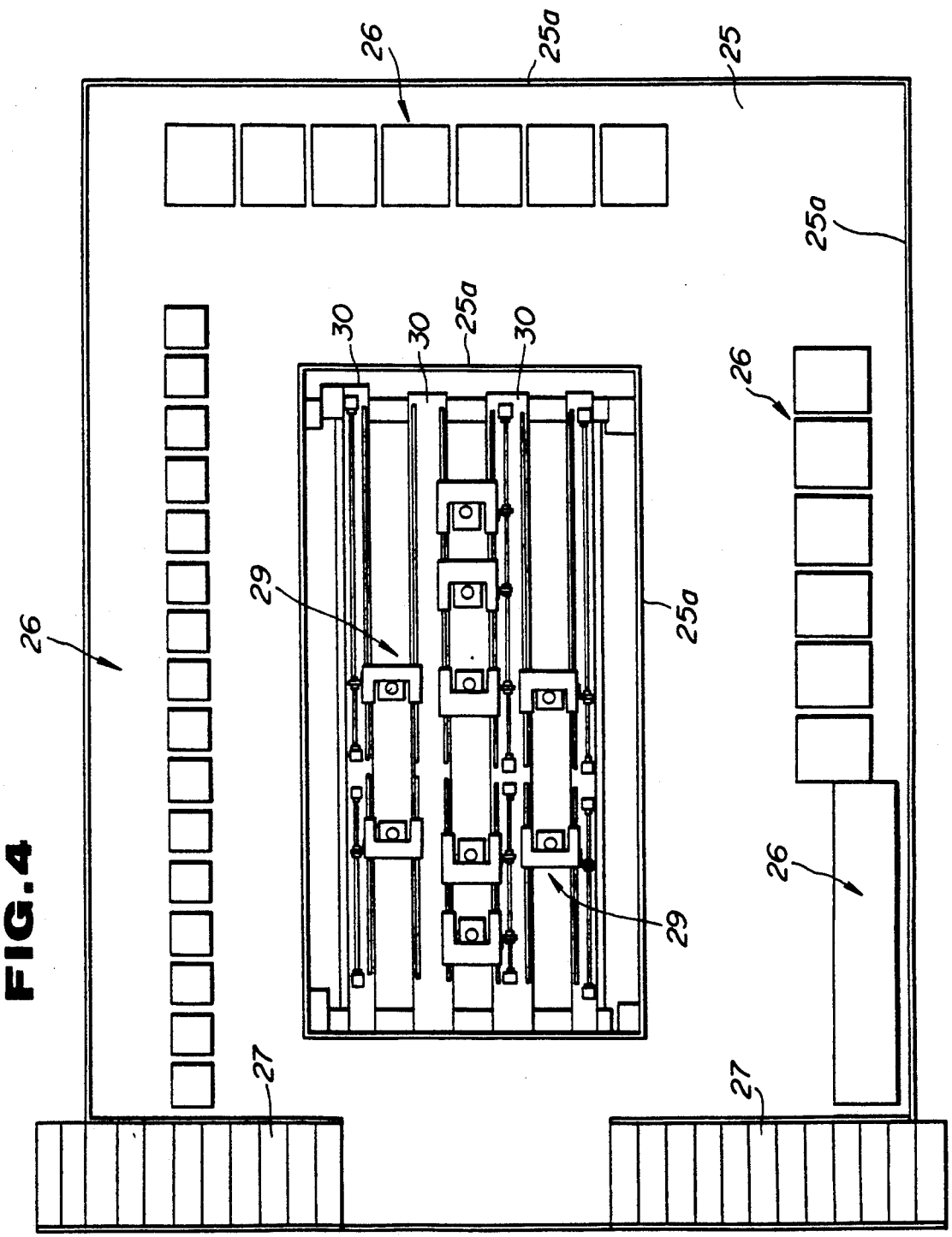
FIG. 4 is a plan view of the tack welding station.
Figure 5:
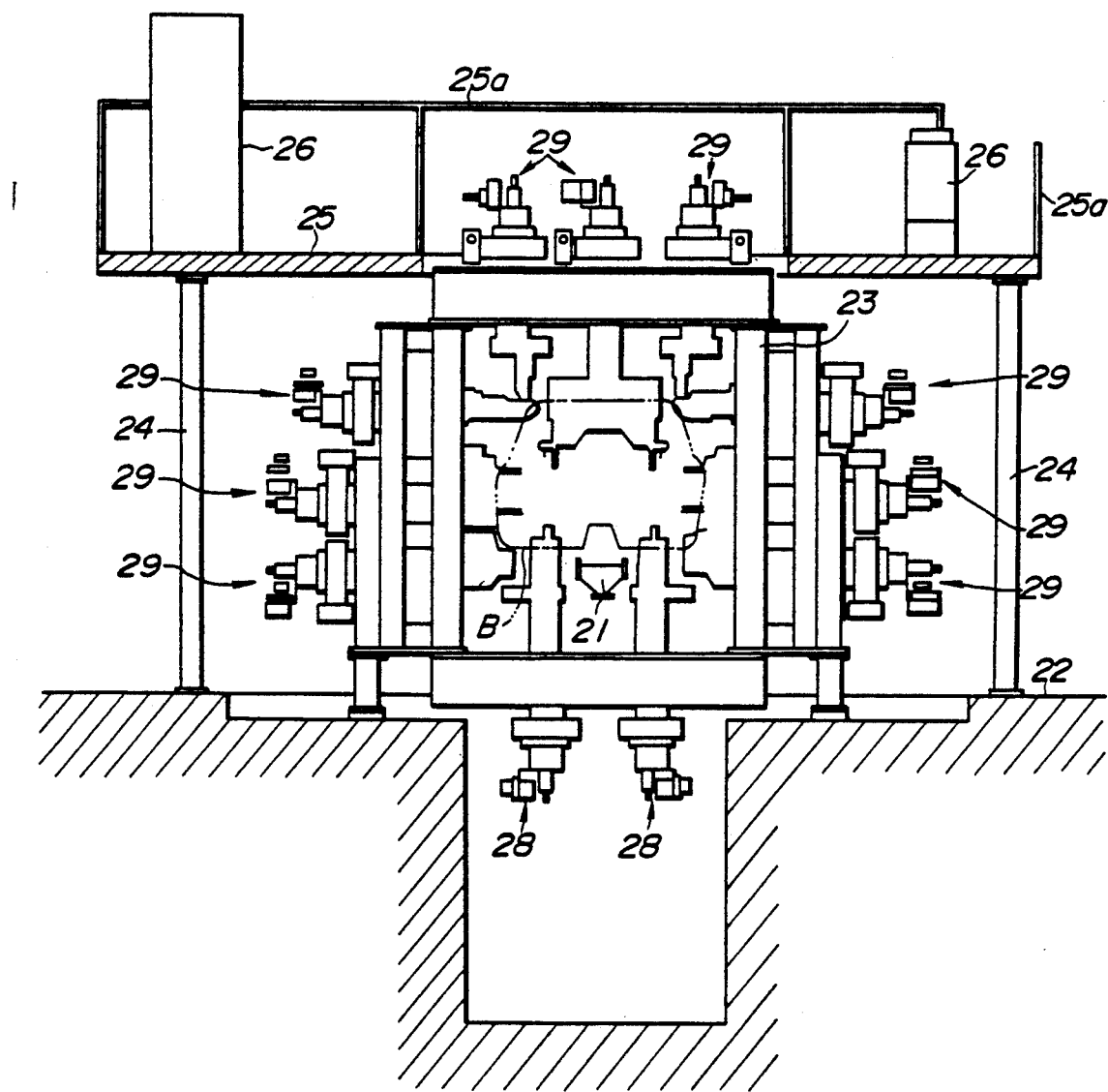
FIG. 5 is a rear view partly in section of the tack welding station.
Figure 6:
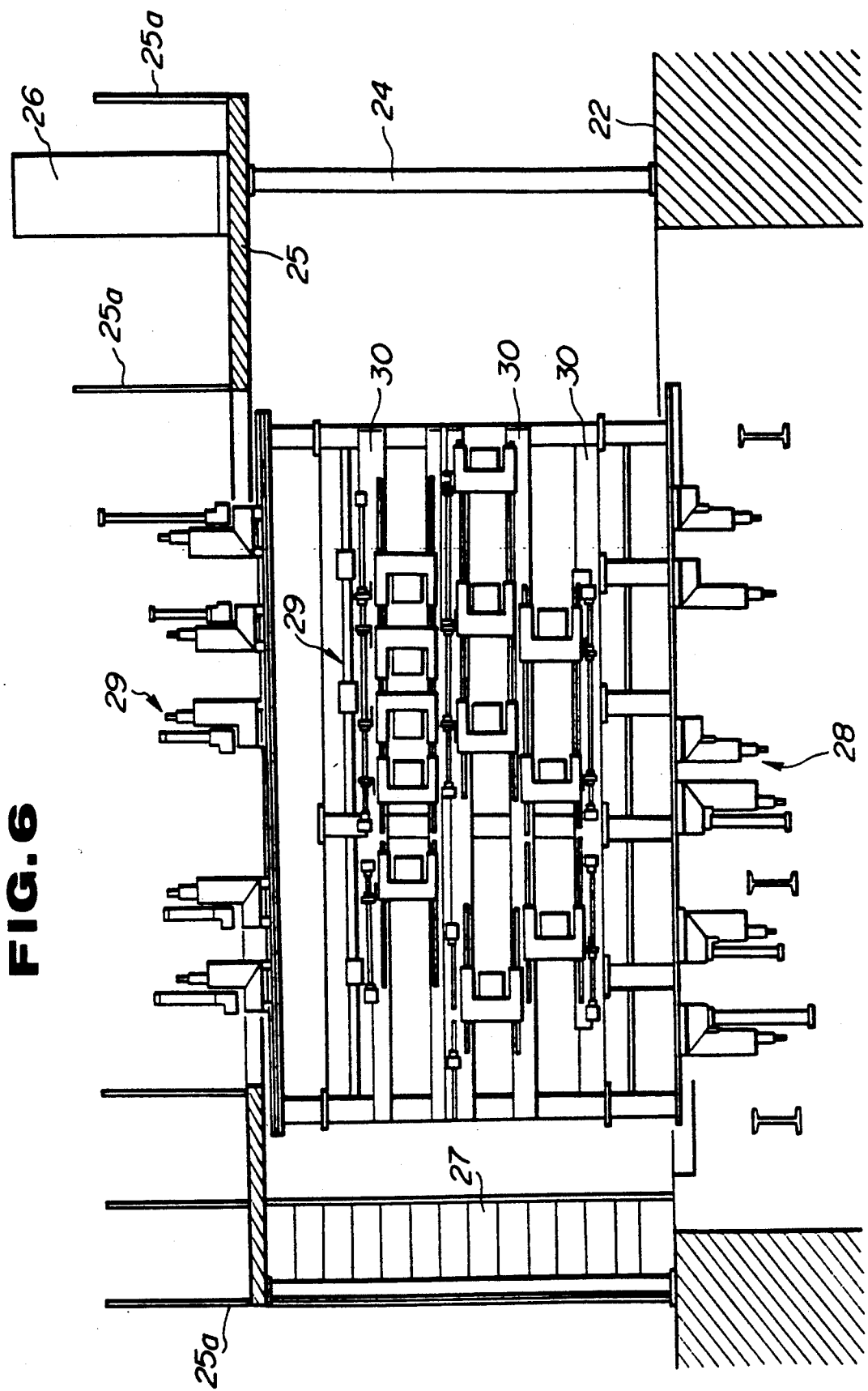
FIG. 6 is a side view partly in section of the tack welding station.

Referring to FIG. 2, there is shown one embodiment of a teaching apparatus made in accordance with the invention. The teaching apparatus is applied to a manipulator arm having n distinct degrees of freedom for its n distinct motions to carry and position a working tool for performing a work function. The motions of the manipulator arm are powered by mechanical actuators 10a, 10b, . . . and 10n in the form of motors utilized in numbers equal to the number of controlled axes of the minipulator arm. Servodrive circuits 11a, 11b, . . . and 11n are provided for controlling the respective machine actuators 10a, 10b, . . . and 10n. The servodrive circuits 11a, 11b, . . . and 11n are electrically connected to respective encoders 12a, 12b, . . . and 12n. Each of the encoders is adapted to sense the displacement of the corresponding mechanical actuator and it produces a signal indicative of the sensed actuator displacement value to the corresponding servodrive circuit. The servodrive circuits 11a, 11b, . . . and 11n are connected commonly through a first serial data line 13 to a control unit 14. The control unit 14 processes a stored program directing the motions of the manipulator arm through the servodrive circuits.

A teach pendant 15 is connected through a second serial data line 16 to the control unit 14 and also through a third serial data line 17 to the servodrive circuits 11a, 11b, . . . and 11n for manually producing motion commands to generate a stored program. The teach pendant 15 has a push button pad having a number of buttons for entering information through the second serial data line 16 to the control unit 14 and through the third serial data line 17 to the servodrive circuits. The push buttons include a teach mode command button and motion command buttons. When the teach mode command button is depressed, the teach pendant 15 produces a teach mode command in the form of a serial signal on the second serial data line 16, causing the control unit 14 to operate in a teach mode. The motion command buttons have distinct numerical digits specifying the respective manipulator arm axes numbered in a predetermined sequence. A motion command button that is depressed produces a motion command in the form of a serial signal with digit information specifying the manipulator arm axis to be moved. As long as the motion command button is depressed, the motion command continues. The motion command is fed through the second serial data line 16 to the control unit 14. The motion command is also fed through the third serial data line 17 to the servodrive circuits 11a, 11b, . . . and 11n. When the motion command button is released, the teach pendant 15 terminates the production of the motion command.

Each of the servodrive circuits includes a data processor and a memory. The data processor is adapted to make a determination as to whether or not the present servodrive circuit is selected. This determination is made based on the digit information of the motion command fed thereto through the third serial data line 17 from the teach pendant 15. The memory temporarily stores the actuator displacement value fed thereto from the corresponding encoder. The data processor transfers the stored actuator displacement value through the first serial data line 13 to the control unit 14 on a command fed through the first serial data line 13 from the control unit 14.

The control unit 14 includes a data processor, a memory, a serial-to-parallel (S/P) converter, and a parallel-to-serial (P/S) converter. The S/P converter converts a serial signal fed thereto from the teach pendant 15 into parallel form for application to the data processor. The processed data are transferred from the data processor to the P/S converter which converts it into serial form for application to the servodrive circuits. When the control unit 14 receives a motion command fed thereto through the second serial data line 16 from the teach pendant 15, it specifies a memory location accomodated to the digit information of the motion command. In response to a teach mode command fed through the second serial data line 16 from the teach pendant 15, the control unit 14 produces a command to transfer the stored actuator displacement value through the first serial data line 13 from the selected servodrive circuit. The transferred actuator displacement value is stored in the specified location in the memory of the control unit 14.

The operation of the teaching apparatus of the invention is as follows: The control unit 14 and the servodrive circuits 11a, 11b, . . . and 11n await receipt of a motion command from the teach pendant 15. When a motion command button is depressed, the teach pendant 15 produces a motion command in the form of a serial signal including digit information specifying a selected servodrive circuit to be actuated for powering the corresponding mechanical actuator. This motion command is fed from the teach pendant 15 through the second serial data line 16 to the control unit 14 and also through the third serial data line 17 to the servodrive circuits 11a, 11b, . . . and 11n. After the receipt of the motion command, the control unit 14 specifies a memory location accomodated to the digit information of the motion command. The selected servodrive circuit, which is accomodated to the digit information of the motion command, responds to the motion command generated through the third serial data line 17 from the teach pendant 15 by powering the corresponding mechanical actuator to effect motion of the corresponding manipulator arm axis. The servodrive circuits other than the selected servodrive circuit effect no function. As long as the motion command button remains depressed, the selected servodrive circuit continues to power the corresponding mechanical actuator. If the motion command button is released, the teach pendant 15 will terminate the production of the motion command and the selected servodrive circuit stops the corresponding mechanical actuator. The corresponding encoder senses the displacement of the corresponding mechanical actuator during the time interval between the time at which the mechanical actuator starts and the time at which the mechanical actuator stops and produces a signal indicative of the sensed value of displacement of the mechanical actuator. This signal is fed from the encoder to the corresponding servodrive circuit which stores the sensed mechanical actuator displacement value.

The control unit 14 awaits receipt of a teach mode command signal from the teach pendant 15. When the teach mode command button is depressed, the teach pendant 15 produces a teach mode command in the form of a serial signal. This teach mode command is fed from the teach pendant 15 through the second serial data line 16 to the control unit 14. After the receipt of the teach mode command, the S/P converter converts it into parallel form for application to the data processor. The processed data are transferred to the P/S converter which converts it into a corresponding serial teach mode control signal. This teach mode control signal is applied from the control unit 14 through the first serial data line 13 to the servodrive circuits. The selected servodrive circuit responds to the teach mode control signal by transferring the stored mechanical actuator displacement value through the first serial data line 13 to the control unit 14 where the data processor stores the transferred mechanical actuator displacement value at the specified location of the computer memory. This sequence is repeated for the servodrive circuits to generate a stored program and record in the computer memory. The stored record is played back by the control unit 14 to control the path of motion of the working tool carred by the manipulator arm. Although the invention has been described in connection with a single manipulator arm, it is to be appreciated that the invention is equally applicable to a plurality of manipulator arms.

Referring to FIGS. 3 to 6, there is shown a tack welding station forming an automobile assembling line with which the invention may be employed. The tack welding station includes a number of inductrial robots 29 each carrying a working tool, such as a clamper, a welding gun, or the like, for performing clamping and spot welding to temporarily assemble an automobile body. The tack welding station receives an automobile body B transferred thereto along a shuttle or transfer bar 21 from the preceding work station where the automobile body B has been temporarily assembled, such as by edge folding, from automobile body components including a floor panel, a roof panel, a rear panel, and left and right side panels. The transfer bar 21 extends through a support frame 23 mounted on a base 22. The support frame 23 supports the industrial robots 29 arranged on the opposite sides of the support frame 23 for movement along guide rails 30 extending in the direction of conveyance of the automobile body B and on the upper side of the support frame 23 for movement along guide rails 30 extending in the direction of conveyance of the automobile body B. A platform 25, which is located above the support frame 23, is supported through posts 24 on the base 22. The platform 25 carries control units 26 thereon. Ladders 27 are provided to permit an operator to ascend and decend the platform 25. The numeral 25a designates safety fences provided on the platform 25.

The tack welding station also includes a plurality of positioning devices 28 provided on the lower side of the support frame 23 for carrying the automobile body B at a height in the tack welding station. The height at which the automobile body B is held is different from one kind of automobile bodies to another. For this reason, each of the positioning device 28 includes a hook or finger adapted to engage with the lower surface of the automobile body B and a cylinder for moving the hook or finger upward and downward, the cylinder being supported for movement in the direction of conveyance of the automobile body B. The control units 26 are programmed to control the motions of the positioning devices 28 and the industrial robots 29.

During a teach mode, the motions of the manipulator arm are controlled directly by the teach pendant rather than the control unit. It is, therefore, apparent that the teaching aparatus of the invention has a rapid response to operator's demands.

What is claimed is:

1. A teaching apparatus for use with at least one manipulator arm for carrying out a plurality of distinct motions to carry and position a work tool for performing a work function, comprising:
- a power unit including actuators for powering the respective motions of the manipulator arm;
- a control unit, coupled through a first data line to the actuators, for controlling the actuators;
- a teach pendant connected through a second data line to the control unit and through a third data line to the actuators, the teach pendant including means for producing a motion command on the second and third data lines, the motion command having digit information specifying a selected one of the distinct motions of the manipulator arm, and means for producing a teach command on the second data line;
- the power unit including means, responsive to the motion command fed thereto through the third data line from the teach pendant, for selecting one of the actuators to power the selected motion of the manipulator arm, and means for measuring a value of displacement of the selected actuator;
- the control unit including
- means, responsive to the motion command fed thereto through the second at a line from the teach pendant, for specifying a memory location accommodated to the digit information of the motion command,
- means, responsive to the teach command fed thereto through the second data line from the teach pendant, for transferring the measured displacement value through the first data line from the power unit, and
- means for storing the transferred displacement value at the specified memory location.

* * * * *